United States Patent [19]

Yamaguchi

[11] Patent Number: 5,043,750
[45] Date of Patent: Aug. 27, 1991

[54] TRIPOD FOR USE WITH A CAMERA
[75] Inventor: Kohichi Yamaguchi, Tokyo, Japan
[73] Assignee: Konica Corporation, Tokyo, Japan
[21] Appl. No.: 596,992
[22] Filed: Oct. 11, 1990
[30] Foreign Application Priority Data
  Oct. 14, 1989 [JP] Japan ................... 1-267187
[51] Int. Cl.⁵ ............................ G03B 17/56
[52] U.S. Cl. ........................ 354/81; 354/293;
  248/163.1; 248/168; 248/170
[58] Field of Search ........... 354/81, 293; 352/243;
  248/163.1, 168, 170
[56] References Cited
  U.S. PATENT DOCUMENTS
  2,684,822  7/1954  Odin ........................ 354/293
  3,804,356  4/1974  Olds ......................... 354/81
  4,324,477  4/1982  Miyazaki ................. 354/293

*Primary Examiner*—A. A. Mathews
*Attorney, Agent, or Firm*—Jordan B. Bierman

[57] ABSTRACT

The invention provides a tripod for use with a camera by which the camera can be set horizontally without any difficulty. The tripod includes a supporting base for supporting a camera thereon through screw mechanism. On the lower surface of the base is provided a central leg composed of a pliantly bendable rod like member. On both the sides of the central leg are symmetrically provided a pair of side legs, each of which is adapted to pivotally open in outwardly slanting direction to a stop position and is shorter than the central leg.

2 Claims, 7 Drawing Sheets

TRIPOD FOR USE WITH A CAMERA

BACKGROUND OF THE INVENTION

The present invention relates to a tripod to which a compact camera is provided in photographing, and more particularly to a compact tripod for use in a camera which is used for photographing on a table and the like.

The tripod for use in a compact camera has a screw member to fix a camera, on the upper surface of its supporting unit (which is called a universal head) so that the camera is fixed to the supporting unit by the screw member. Three adjustable legs are provided to the downward surface of the supporting unit that is used for supporting legs. The tripod is used in such a manner that: the legs are extended so that the leg positions can be located at the tops of a triangle formed on the ground; the length of the leg is adjusted so that the center of gravity of the camera can be placed inside the triangle; the tripod is installed on the ground; and further the tripod is adjusted while a photographer is looking into a viewfinder.

There is a tripod having flexible legs which are composed in such a manner that the three legs of the tripod can be freely folded. In this case, the actual length of the legs and the positions of the tops of the tripod are adjusted by folding the legs of the tripod so that the camera can be set at a suitable photographing position.

The tripod for use in a compact camera has a simple structure. However, it is not necessarily easy to set a tripod provided with a camera at a suitable photographing position. When a camera provided to a tripod is inclined, the horizontal line on the photographed picture is also inclined and the portrait is inclined, too, which is not desirable. When a photographer takes a photograph while holding a camera in his hands, he unconsciously holds the camera horizontally. However, when a tripod is used, the photographer must adjust the length of the tripod legs and the leg positions so that the camera ca be set horizontally.

SUMMARY OF THE INVENTION

The object of the present invention is to provide a tripod for use in a camera by which the camera can be set horizontally without any difficulty.

The above-described object can be accomplished by a tripod for use in a camera which is characterized in that: a screw member is provided to the upper surface of the supporting unit; a central leg composed of a flexible member is provided to the downward surface of the supporting unit; and two side legs are symmetrically provided to both sides of the central leg, wherein the side legs can be opened to the stop position and the length of the side legs is shorter than that of the central leg.

DESCRIPTION OF THE PREFERRED EMBODIMENTS

The tripod for use in a camera of the present invention, which will be explained in an example, combines the function of a tripod for use in a common compact camera and the function of a tripod for use in an automatic release camera provided with the panning function which will be explained later, so that panning photography can be taken using the tripod. At the outset, the function of a tripod for use in a common camera by which stationary photography is taken, will be explained as follows.

Figure 1:
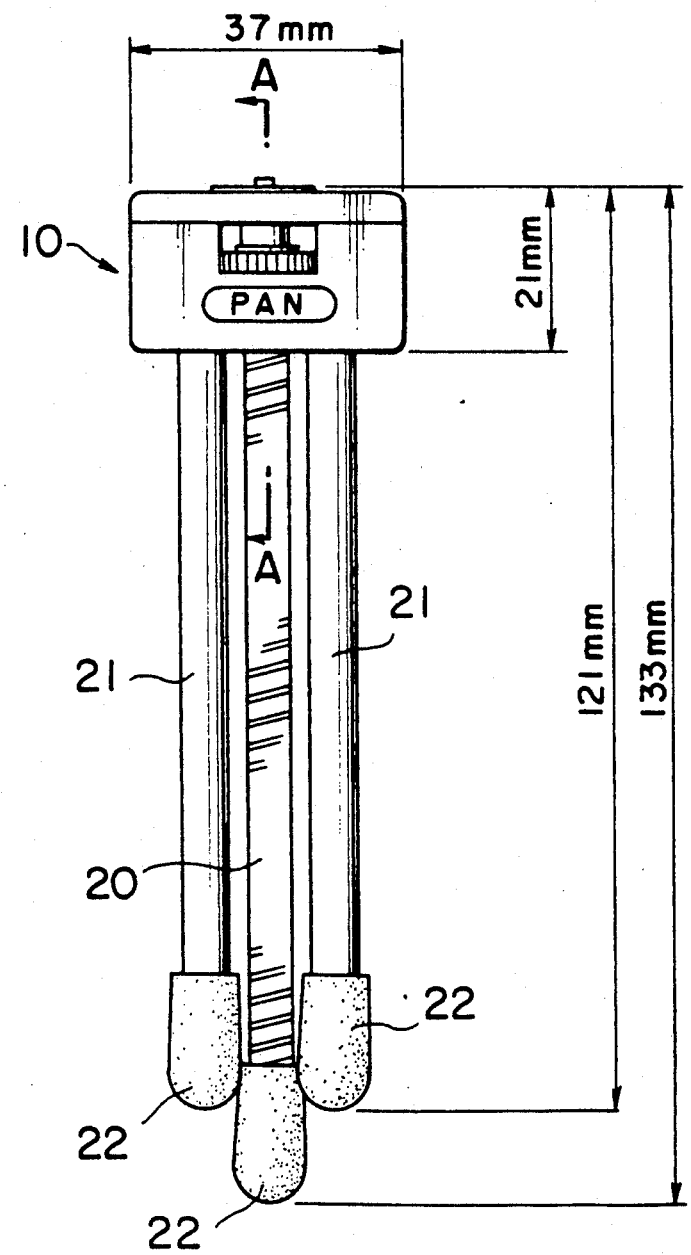
FIG. 1 and FIG. 2 are drawings which show the appearance of the tripod of the present invention.
Figure 2:
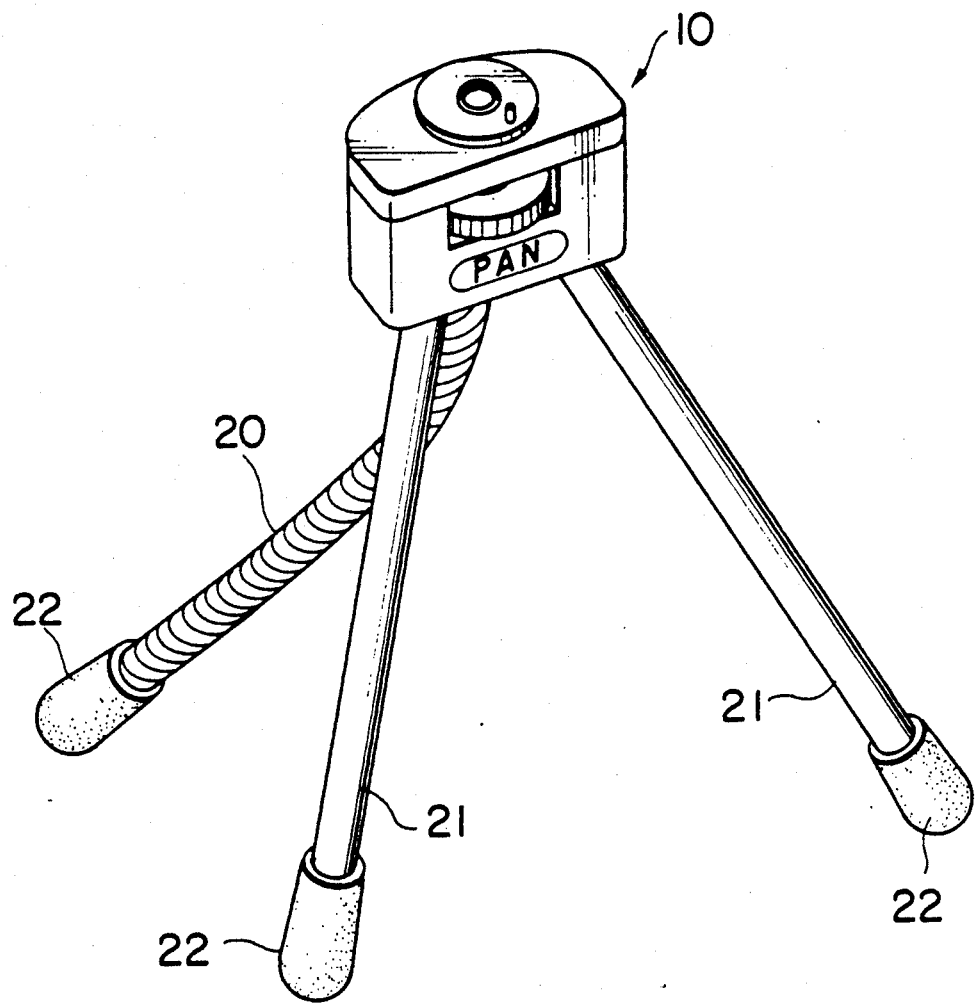

The tripod for use in a camera of the present invention is illustrated in FIG. 1, FIG. 2, and FIG. 3.

The above-described tripod is composed of: the supporting unit 10 on which a camera is positioned and fixed; the flexible central leg 20 which is fixed to the center of the underside of the supporting unit 10; and the side legs 21 which can be opened to the outside stop position symmetrically with regard to the central leg 20.

The above-described central leg 20 is formed in such a manner that a metal strip is wound spirally, so that the central leg 20 can be composed of the member having flexibility and adequate stiffness, and the upper end of the central leg 20 is fixed to the under side of the above-described supporting unit 10. On the other hand, the above-described side legs 21 are made from hard synthetic resin, and the upper ends of the side legs 21 are rotatably provided to the under side of the supporting unit 10 by a widely known pivotal mechanism so that the side legs and the above-described central leg 20 can form isosceles triangle. The upper end of the central leg 20 may not be fixed to the under side of the supporting unit 10, but it may be rotatably provide it to the under side of the supporting unit 10 by the widely known pivotal mechanism in the same way as the side legs 21.

The above-described tripod is used in such a manner that: a screw member to hold a camera, which will be described later, is screwed to a screw provided to the bottom portion of the camera so that the camera can be fixed to the supporting unit 10; then the above-described side legs 21 are symmetrically opened to the outside stop position as illustrated in FIG. 2 and by this mechanism the camera can be automatically held horizontally; on the other hand the camera angle in the vertical direction can be freely adjusted when the elevation angle of the camera is adjusted by bending the above-described central leg 20 adequately; and further the rubber cap 22 is provided to the lower end of each leg so that each leg can not slip from the setting position.

Consequently, according to the above-described tripod, the horizontal angle of a camera can be automatically determined only by opening a pair of side legs 21, and the elevation angle of the camera can be freely controlled by adjusting the bend of the central leg 20 without changing the horizontal state of the camera, so that the camera angle to an object can be very easily and quickly adjusted.

The figures illustrated in FIG. 1 show the size of each portion of an example of a tripod that is suitable for a light compact camera to which a 35 mm roll film is applied, for example. In order to adjust the camera position, it is preferable that the length of the side legs 21 is shorter by 10% than that of the central leg 20.

Figure 3A:
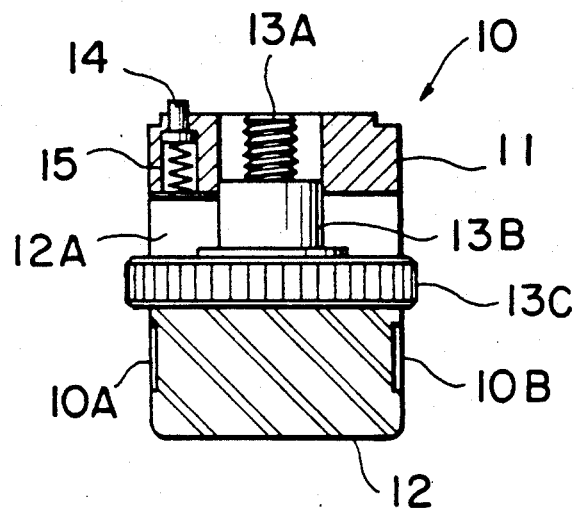
FIG. 3 is a sectional view of the main portion of the tripod of the present invention.

FIG. 3(A) is a sectional view of the above-described supporting unit 10 taken on line A—A of FIG. 1.

The above-described supporting unit 10 is integrally composed of the upper member 11 on which a camera is placed and of the lower member 12 to which the above-described central leg 20 and the side legs 21 are provided. The above-described upper member 11 is fixed to the above-described lower member 12, while the above-described screw member 13 is contained in the cut-out portion 12A located at the center of the lower member 12, and the screw member 13 can be raised and lowered in the cut-out portion 12A.

The engagement pin 14 is buried at a predetermined position on the upper surface of the upper member 11, the axial line of the engagement pin 14 is parallel to the axial line of the above-described screw member 13, and the top portion of the pin 14 is always protruded from the upper surface of the upper member 11 by the action of a built-in compression spring.

The side 10A of the supporting unit 10 to which the above-described engagement pin 14 is provided, is labeled "PAN" and the opposite side 10B is labeled "FIX".

Figure 3B:
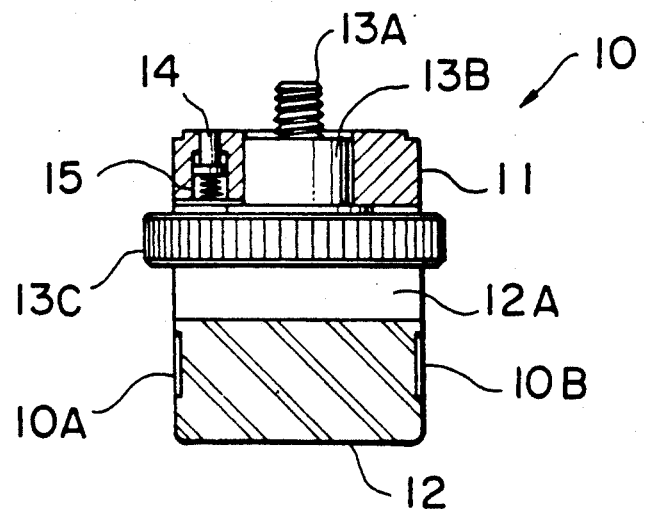

The above-described screw member 13 is integrally composed of: the screw portion 13A which is engaged with the set screw of a camera; the body 13B; and the knob 13C for use in rotation. A common camera is set on the supporting unit 10 in such a manner that: the knob 13C is rotated while it is pushed upward so that the screw member 13A ca be engaged with the set screw of the camera placed on the supporting unit 10; and finally the camera is fixed to the supporting unit 10 when the upper member 11 of the knob 13C comes into contact with the bottom surface of the camera. In this case, the above-described engagement pin 14 is pressed by the bottom surface of the camera and is buried in the upper member 11 as illustrated in FIG. 3(B).

When an automatic release camera having a mechanism shown in FIG. 4 to FIG. 10 is provided to the tripod of the present invention, it is possible to conduct automatic panning photography, so that extensive and various photography can be realized.

Figure 4:
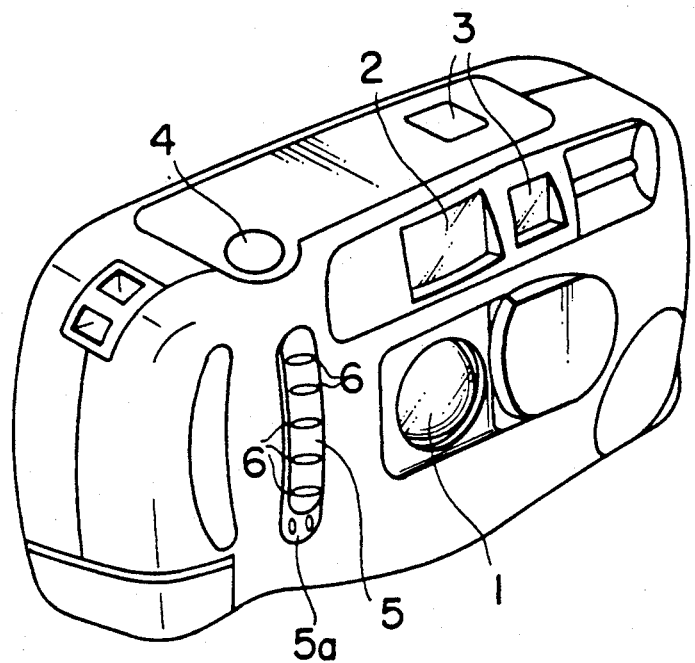
FIG. 4 is a drawing which shows the appearance of an automatic release camera.

FIG. 4 shows the appearance of the above-described automatic release camera, and this camera has the function of detecting the input voice and the function of conducting the release operation when the detected voice satisfies a predetermined condition.

In FIG. 4, the numeral 1 is a camera lens, the numeral 2 is a viewfinder, and the numeral 3 is a monitoring window to range a photographing object, wherein the monitoring window is installed in order to watch the object from the upper position when the camera is provided to the above-described tripod. The numeral 4 is a release button which is used in ordinary photography. The numeral 5 is an automatic release lever. A group of LEDs 6 to display the sound pressure level are provided on the front side. When the automatic release lever is slid upward or downward, the microphone hole 5a behind which a microphone is provided is opened and closed, and when the microphone hole 5a is exposed, the automatic release is changed over so that photographing can be automatically conducted by a voice.

Figure 5:
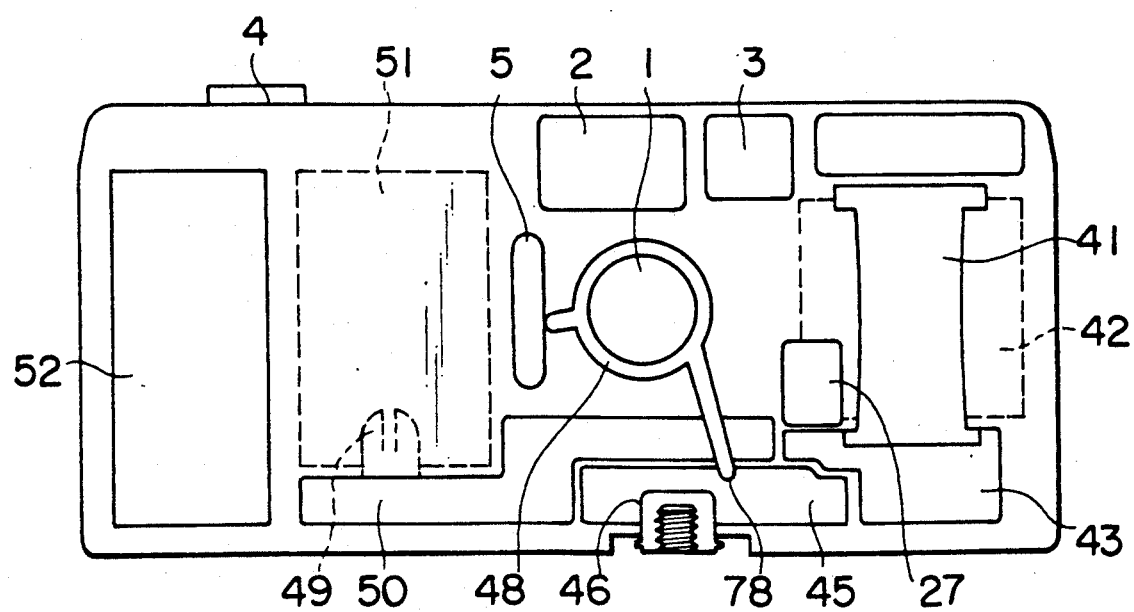
FIG. 5 to FIG. 10 are plan views and sectional views of the main portions of the above-mentioned camera.

FIG. 5 is a drawing which shows the arrangement of the panning mechanism and other units. In the drawing, like reference numbers designate corresponding parts throughout FIG. 4 and FIG. 5, and the explanations will be omitted.

In the drawing, the numeral 41 is a reel to wind a film. The numeral 42 is a reel chamber. The numeral 43 is a winding mechanism which is driven by the motor 27, and the reel 41 is rotated by the winding mechanism 43 in the winding direction. The numeral 45 is a panning mechanism which is driven by the motor 27. The numeral 46 is a screw for setting the camera on the tripod which is a camera supporting means. The numeral 48 is a lens holder which holds the camera lens 1. The numeral 49 is a film rewinding shaft which engages with the winding shaft of a film magazine. The numeral 50 is a film rewinding mechanism which rotates the rewinding shaft 49. The film rewinding mechanism 50 is driven by the motor 27. The numeral 51 is a film magazine chamber. The numeral 52 is a battery chamber.

Figure 6:
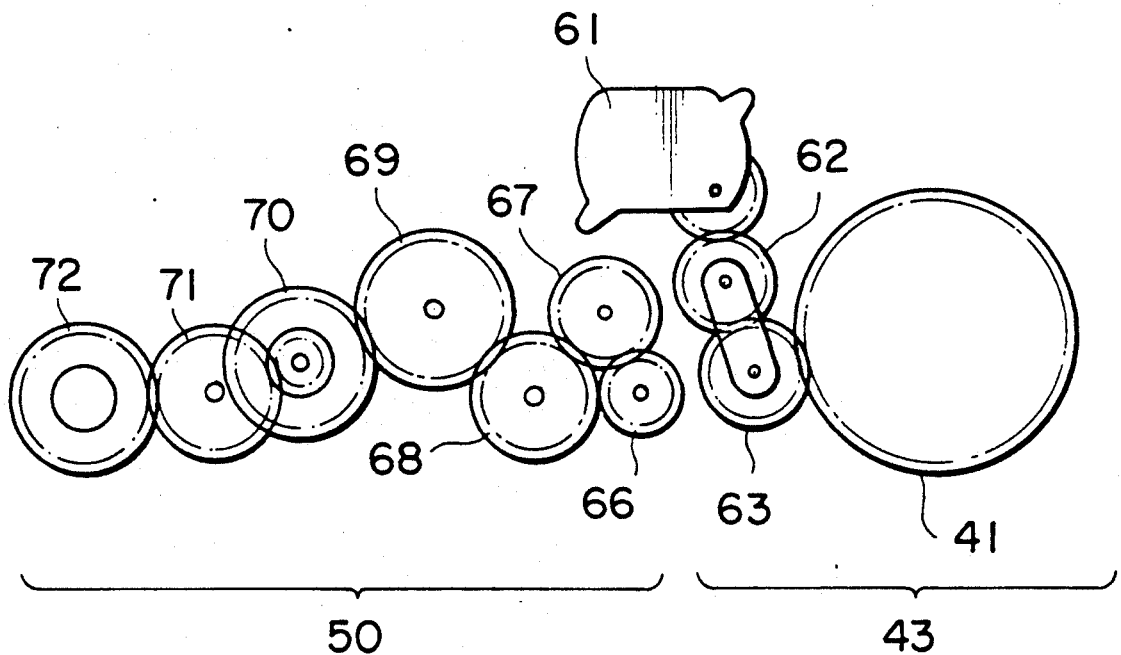

FIG. 6 is a bottom plan view which shows the composition of the winding mechanism 43 and the rewinding mechanism 50.

Figure 7:
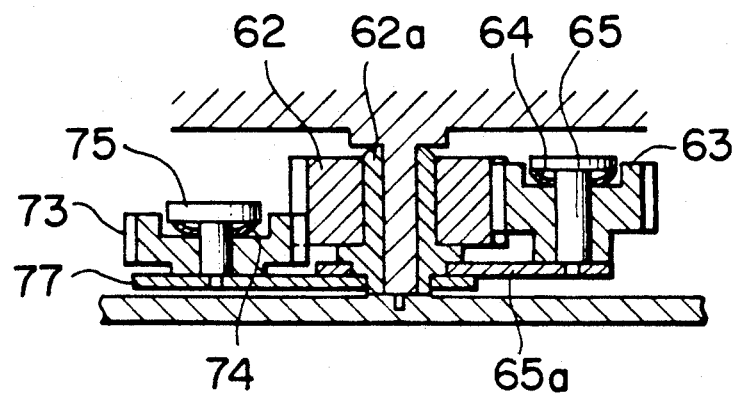

In the drawing, the numeral 61 is a motor gear unit which reduces the rotation speed of the motor 27. The torque is transmitted through the motor gear unit 61 to the drive gear 62. The drive gear 62 is composed as illustrated in FIG. 7, and the winding planetary gear 63 is frictionally connected with the winding planetary shaft 65 under the function of the frictional spring 64. The winding planetary shaft 65 is provided to the winding planetary lever 65a, and the winding planetary lever 65a is rotatably provided to the drive shaft 62a which is the center shaft of the drive gear 62. When the drive gear 62 is rotated counterclockwise in the drawing, the winding planetary gear 63 engages with the reel 41 and gives torque to the reel 41, so that the reel 41 is rotated in the direction of film winding (counterclockwise).

On the other hand, when the drive gear 62 is rotated clockwise, the winding planetary gear 63 itself is rotated clockwise around the drive gear 62, and the gear 63 engages with the first rewinding gear 66 and transmits torque to the gear 66. The first rewinding gear 66 rotates the rewinding shaft gear 72 through the rewinding gear train 67 to 71. The rewinding shaft 49 is rotated clockwise in this way so that the film can be rewound.

Figure 8:
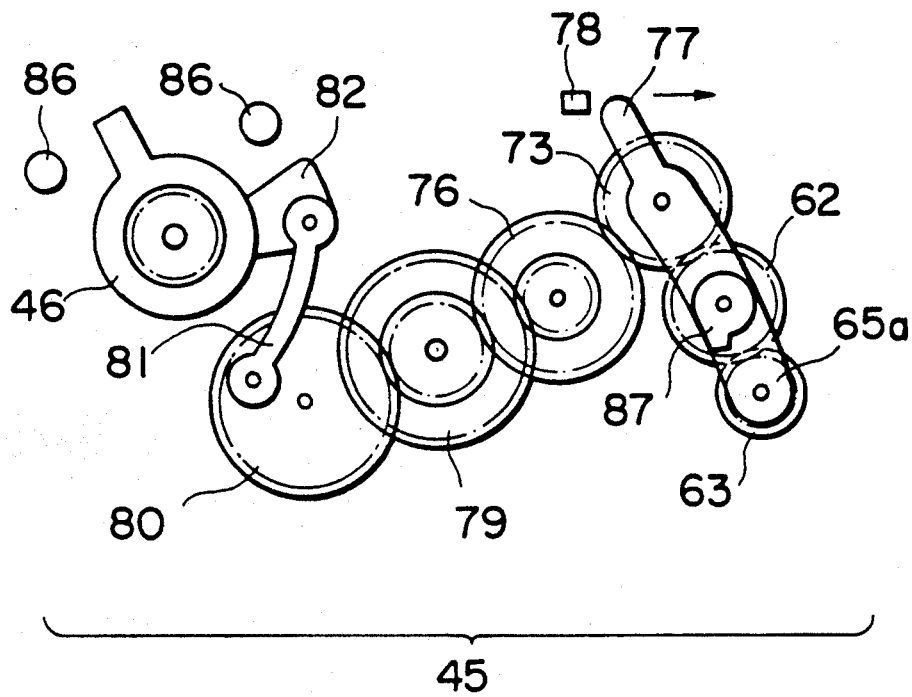

FIG. 8 is a bottom plan view which shows the panning mechanism 45.

The drive gear 62 is engaged with the oscillating planetary gear 73 which has the same composition as the winding planetary gear 63. Namely, the oscillating planetary gear 73 is frictionally connected with the oscillating planetary shaft 75 under the function of the frictional spring 74 (Refer to FIG. 7.). When the drive gear 62 is rotated counterclockwise, the oscillating planetary gear 73 itself is rotated counterclockwise around the drive gear 62, and it engages with the first oscillating gear 76 and transmits torque.

The oscillating planetary gear 73 is provided to the oscillating planetary lever 77. When the oscillating planetary lever 77 is moved by the changeover lever 78 in the direction of an arrow in the drawing, the oscillating planetary gear 73 is disengaged from the first oscillating gear 76, so that the oscillation can be stopped. The changeover lever 78 is connected with the lens holder 48. When the automatic release lever 5 is slid downward (turned off), the lens holder 48 is rotated counterclockwise by the lever 5 and the oscillating planetary lever 77 is pushed by the changeover lever 78, so that oscillation can not be conducted. When the automatic release lever 5 is slid upward (turned on), the restriction by the changeover lever is released and oscillation can be conducted.

The first oscillating gear 76 is a two step gear and transmits torque to the second oscillating gear 79 which is also a two step gear so that the speed is further reduced, and the third oscillating gear 80 is rotated.

Figure 9:
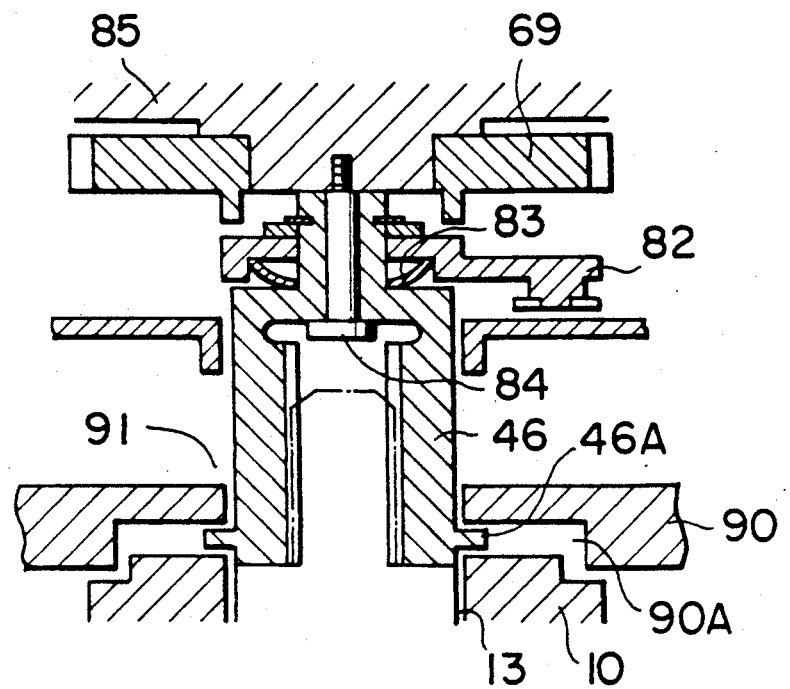

The third oscillating gear 80, the arm 81, and the oscillating lever 82 has a crank mechanism, and when the third oscillating gear 80 is rotated, the oscillating lever 82 conducts oscillating motions. As illustrated in FIG. 9, the oscillating lever 82 is frictionally connected with the tripod setting screw 46 under the function of the frictional spring 83. The tripod setting screw 46 is rotatably provided to the camera body 85 by the long screw 84. Accordingly, when the oscillating lever 82 is activated, the tripod setting screw 46 is oscillated.

Figure 10:
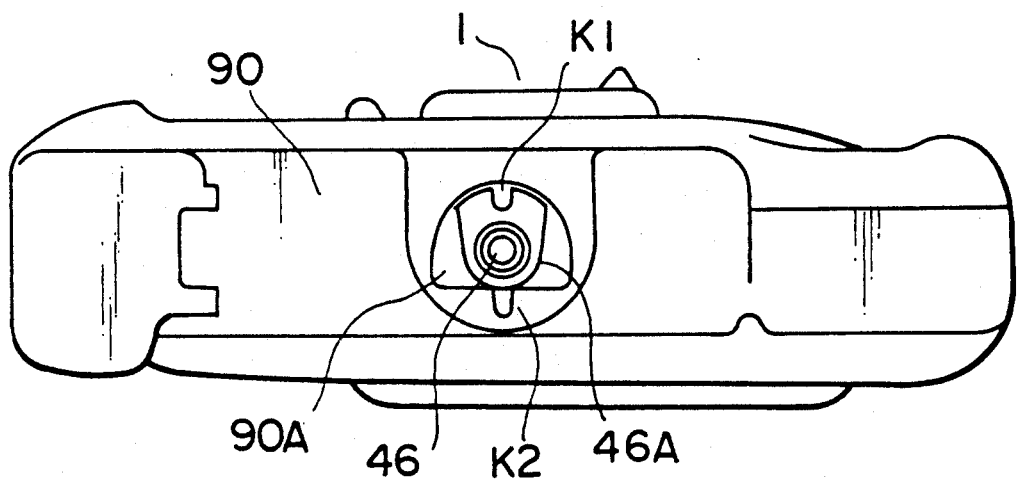

FIG. 10 shows the bottom of a camera. The flange 46A is integrally provided to the edge portion of the above-described tripod setting screw 46, and the tripod screw 46 is oscillated in the space formed by the cut-out portion 90A of the camera bottom cover 90.

The edge surfaces of the above-described flange portion 46A and the cut-out portion 90A are provided with the cutout K1 and the cutout K2 which engage with the engagement pin 14 provided to the supporting unit 10 of the tripod.

The above-described cutout K1 and k2 are located on the line which is parallel with the optical axis of the camera lens 1 and which passes through the axial center of the tripod setting screw 46, wherein the cutout K1 and K2 are symmetrically located with regard to the tripod setting screw 46.

The relation between the above-described tripod setting screw 46 and the bottom cover 90 is illustrated in FIG. 9. The tripod setting screw 46 and the flange 46A which is provided to its edge portion, are protruded from the opening 91 of the bottom cover 90 and contained in the space of the above-described cut-out portion 90A.

When a camera is provided to the supporting unit 10 of the tripod, a small gap is formed between the upper surface of the supporting unit 10 and the above-described flange 46A, and between the upper surface and the bottom cover 90, so that the tripod setting screw 46 and the bottom cover 90 of the camera body, can be respectively rotated with regard to the tripod. However, the oscillating motion of either the tripod setting screw 46 or the camera body ca be restricted according to the engagement of the cutout K1 or the cutout K2 and the engagement pin 14 of the supporting unit 10.

Since the tripod setting screw 46 is engaged with the above-described screw member 13 of the tripod a illustrated in FIG. 9, the camera is rotatably connected with the tripod. When the engagement pin 14 is engaged with the cutout K1 which is provided to the flange 46A of the tripod setting screw 46, the rotation of the tripod setting screw 46 is restricted by the tripod, so that the camera itself is panned by the reaction force within a predetermined range of rotation angle. At this moment, the front side of the camera, which is the lens side of the camera, faces the side of the supporting unit 10 on which "PAN" is labeled, so that the state that the camera is panned can be indicated.

On the other hand, when the engagement pin 14 is inserted into the cutout K2 provided to the bottom cover 90 of the camera, the rotation of the camera body is restricted. As a result, the tripod setting screw 46 is oscillated integrally with the screw member 13 of the tripod. In this case, the front side of the camera faces the side of the supporting unit 10 on which "FIX" is labeled, so that the state that the camera is not panned can be indicated.

The reason why the panning lever 82 is frictionally connected with the tripod setting screw 46, is to protect the gear train from receiving a strong force. At the frictional portion, the stopper 86 is provided in order to prevent the tripod setting screw 46 from idle running when the tripod setting screw 46 is set at the tripod.

The output of a film feed detecting device, which is not illustrated in the drawing, is sent to the CPU, and when the CPU detects that a film is wound up one frame portion, the motor 27 is stopped. Accordingly, the camera panning is also stopped. As the diameter of the reel 41 as winding a film is increased, the rotation angle of the reel in each case the film is wound up one frame portion, is decreased gradually and the running time of the motor 27 is also decreased. Consequently, the panning angle of the camera is randomly varied according to the crank mechanism and the running time of the motor 27, wherein the crank mechanism is composed of the third oscillating gear 80, the arm 81, and the oscillating lever 82. When a drive means which is not used while exposure operation is conducted, such as the film winding motor, the AF lens controlling means, the lens focus changing means, and the like, is used for panning the camera, an electrical or mechanical particular means to prohibit camera panning is not needed, and further the start signal and the stop signal of the changing means are not particularly needed, and furthermore the circuit composition becomes simple.

The numeral 87 is a stopper having the function of a fail-safe which works in the case the friction mechanism of the panning lever 82 and the tripod setting screw 46 is out of order. The moving of the film while exposure is conducted can be prevented by the stopper 87, wherein the moving of the film position is caused as follows. When the tripod is set at the camera, the external force is transmitted to the rewinding mechanism through the gear train, so that the film is forced to move.

Namely, assuming that the frictional mechanism does not work, the external force to squeeze the tripod is directly transmitted to the third oscillating gear 80 and the third oscillating gear 80 is rotated clockwise or counterclockwise according to the positional relation between the gear 80 and the arm 81. Assuming that the third oscillating gear 80 is rotated clockwise, the first oscillating gear 76 is also rotated clockwise and the force is transmitted to the oscillating planetary gear 73 so that the drive gear 62 is also rotated clockwise. For that reason, the winding planetary lever 65a is rotated clockwise around the drive gear 62, and the winding planetary gear 63 is forced to move in the direction of the first rewinding gear 66. However, the rotation of the winding planetary lever 65a is stopped by the stopper 87, so that the winding planetary gear 63 is not engaged with the first rewinding gear 66. Therefore, even when the frictional mechanisms of the oscillating lever 82 and the tripod setting screw 46 are out of order, the film is not mistakenly rewound by the force given from the outside when the tripod is set.

When the third panning gear 80 is rotated counterclockwise by the external force, the first oscillating gear 76 is also rotated counterclockwise and the oscillating planetary gear 73 is departed from the first oscillating gear 76, so that the external force is never transmitted to the rewinding mechanism 50.

The tripod for use in a camera of the present invention can be used not only for an ordinary camera but also for a camera in which the release operation can be controlled by the signal sent from various kinds of sensors such as an infrared sensor, a heat sensor, and the like so that panning photography and other various photography can be conducted.

In this example, the leg length of the tripod is fixed, however the present invention can be applied to a tripod, the legs of which can be extended. In this case, the length of both legs must be the same, so that it is desirable that the legs are marked in order to prescribe the length of extended legs.

According to the present invention, a useful tripod for use in a camera which is widely used in various fields, can be provided, wherein the tripod is characterized in that: the camera position with regard to a photographic object can be easily adjusted; not only an ordinary camera but also a special camera having the panning function can be provided to the tripod; panning photography or stationary photography can be selected only by resetting the camera; and the camera can be held horizontally and panning photography can be performed while it is held horizontally.

What is claimed is:

1. A tripod for use with a camera, comprising:
   supporting means for supporting a camera thereon;
   a central leg provided to the downward surface of the supporting means and composed of a pliantly bendable member; and
   a pair of side legs symmetrically provided to both sides of the central leg, each of which is adapted to pivotally open in outwardly slanting direction to a stop position and is shorter than the central leg.

2. The tripod of claim 1,
   wherein one end of the central leg is fixed to the supporting means and the other end can move in any direction by bending a part of the leg.

* * * * *